United States Patent
Han et al.

(10) Patent No.: US 11,642,783 B2
(45) Date of Patent: May 9, 2023

(54) AUTOMATED GENERATION OF ROBOTIC COMPUTER PROGRAM CODE

(71) Applicant: INTERNATIONAL BUSINESS MACHINES CORPORATION, Armonk, NY (US)

(72) Inventors: Xue Han, Beijing (CN); Ya Bin Dang, Beijing (CN); Lijun Mei, Beijing (CN); Zi Ming Huang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 706 days.

(21) Appl. No.: 16/699,866

(22) Filed: Dec. 2, 2019

(65) Prior Publication Data
US 2021/0162592 A1 Jun. 3, 2021

(51) Int. Cl.
*B25J 9/16* (2006.01)
*G06N 5/04* (2023.01)

(52) U.S. Cl.
CPC ........... *B25J 9/163* (2013.01); *G06N 5/04* (2013.01)

(58) Field of Classification Search
CPC ......... B25J 9/163; G06N 20/00; G06N 5/022; G06N 5/04
See application file for complete search history.

(56) References Cited

U.S. PATENT DOCUMENTS

| | | | |
|---|---|---|---|
| 10,268,333 B2 | 4/2019 | Nychis et al. | |
| 2012/0117569 A1* | 5/2012 | Fogel | G06Q 30/0635 718/102 |
| 2017/0001308 A1* | 1/2017 | Bataller | G05B 19/0423 726/8 |
| 2017/0293550 A1 | 10/2017 | Song | |
| 2017/0352041 A1* | 12/2017 | Ramamurthy | G06N 5/043 |
| 2018/0074931 A1* | 3/2018 | Garcia | G06F 11/3409 |
| 2019/0056928 A1 | 2/2019 | Smal et al. | |

(Continued)

OTHER PUBLICATIONS

Baker et al., "Toward Adaptation and Reuse of Advanced Robotic Software," Conference Paper, Proceedings of the International Conference on Robotics and Automation, May 2011, pp. 6071-6077.

(Continued)

*Primary Examiner* — Kidest Bahta
(74) *Attorney, Agent, or Firm* — Cantor Colburn LLP; Joseph Petrokaitis

(57) ABSTRACT

Methods, systems and computer program products for providing automated robotic process automation design generation are provided. Aspects include receiving a set of stored automated sub-processes. Aspects also include receiving a process description document that describes a desired computer automated task (CAT) process. Aspects also include identifying a plurality of candidate sub-processes based on the process description document. Aspects also include identifying at least one matching sub-process based on a comparison of each of the plurality of candidate sub-processes to the set of stored automated sub-processes. The at least one matching sub-process is a stored automated sub-process that exceeds a threshold level of similarity to a candidate sub-process. Aspects also include generating a recommendation to automatically populate a portion of a CAT design file for the desired CAT process based on the at least one matching sub-process.

13 Claims, 9 Drawing Sheets

(56) References Cited

U.S. PATENT DOCUMENTS

2020/0206920 A1* 7/2020 Ma ...................... G06K 9/6223

OTHER PUBLICATIONS

Han et al., "Automating a Process Using Robotic Process Automation Code," U.S. Appl. No. 16/246,728, filed Jan. 14, 2019.
List of IBM Patents or Patent Applications Treated as Related; Date Filed: Dec. 2, 2019; 2 pages.
Mallet et al., "Reusable Robotics Software Collection," LAAS/CNRS, Intelligent Systems Research Insitute, 6 pages.

* cited by examiner

US 11,642,783 B2

AUTOMATED GENERATION OF ROBOTIC COMPUTER PROGRAM CODE

BACKGROUND

The present invention generally relates to processing devices, and more specifically, to providing automated robotic process automation design generation.

Robotic process automation (RPA) systems (or robotic computer program code) are software bots configured to automate highly repetitive, routine tasks that are normally performed manually by workers. For example, tasks that involve multiple steps that are executed on a computer by a user such as opening a document, accessing a website, performing a login action and the like can be automated using RPA to save the user time when attempting to perform the specified functions. RPA platform development tools can be used by a developer to create an RPA flow chart of steps that are converted into code that can be executed to perform an intended RPA function.

SUMMARY

Embodiments of the present invention are directed to providing automated RPA design generation. A non-limiting example computer-implemented method includes receiving a set of stored automated sub-processes. The method also includes receiving a process description document that describes a desired computer automated task (CAT) process. The method also includes identifying a plurality of candidate sub-processes based on the process description document. The method also includes identifying at least one matching sub-process based on a comparison of each of the plurality of candidate sub-processes to the set of stored automated sub-processes. The at least one matching sub-process is a stored automated sub-process of the set of stored automated sub-processes that exceeds a threshold level of similarity to a candidate sub-process of the plurality of candidate sub-processes. The method also includes generating a recommendation to automatically populate a portion of a CAT design file for the desired CAT process based on the at least one matching sub-process.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
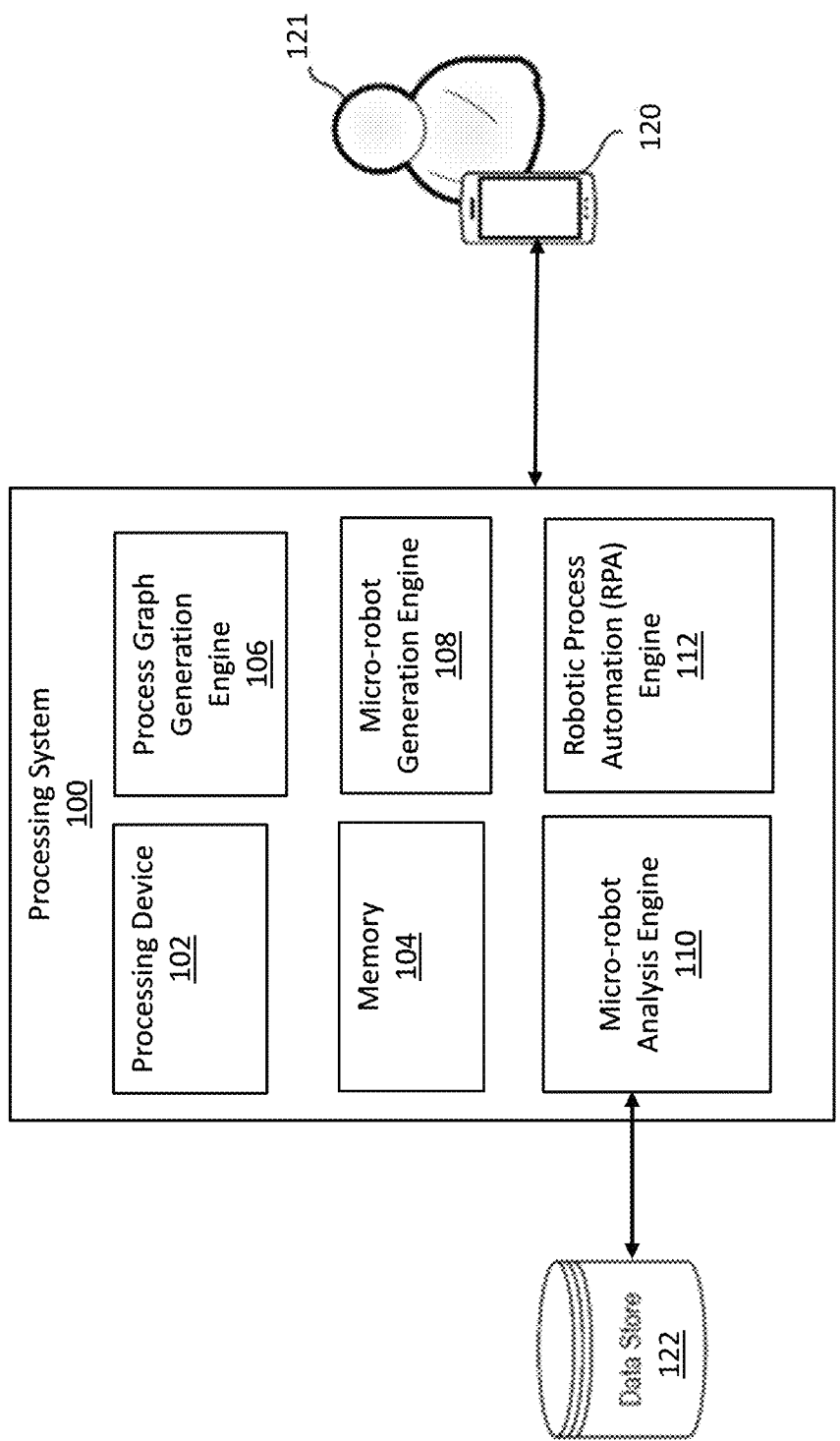
FIG. 1 depicts a system upon which providing automated robotic process automation (RPA) design generation may be implemented according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

RPA bots execute processes that are routine and repetitive, such as for example, a process of opening a new account for a customer, which generally requires a same set of steps, such as collecting customer identification information, verifying the customer identity, collecting information about the type of account to be opened, prompting the customer to generate user credentials (e.g., username and password), preparing documents for customer signature, validating the customer documents, activating the new account, and so on. As will be understood by those of skill in the art, various of such steps may be carried out by an RPA bot. An RPA bot (or RPA robot) can be a software program (i.e., robotic computer program code) that is designed to interact with a user (e.g., a customer) and/or a system (e.g., backend server) to collect information and perform various automated tasks. Although the description provided herein is generally directed to RPA bots and processes, the description is not intended to be limited as such, and the techniques herein can be applied to any such tool that can be used for automating computer tasks (i.e., computer automated task ("CAT") processes) such as for example, screen scraping technology.

RPA tools such as for example, Uipath, BluePrism, and/or Automation Anywhere, exist that can be used to assist with defining process flows of tasks to be carried about by an RPA bot. Typically, such RPA tools include a user interface that allows the user to create an RPA flow chart that charts out all of the steps of an RPA process. Each step of the process may be represented by a box in the RPA flow chart that connects to other blocks in a specified order of operations. Each box of the RPA flow chart may also be associated with a set of program code that when executed, performs the function of the box. A given RPA bot is formed from the totality of all of the code for all of the boxes of a given RPA flow chart. Conventionally, a designer of an RPA bot is required to manually construct the RPA flow chart and accompanying code using the RPA tool, which is generally very time consuming, particular if the RPA process is large and complex. For example, to build an RPA bot from scratch, a designer can use an RPA tool to define an RPA flow chart that includes blocks that represent sequential steps (as indicated by connections between blocks) of an RPA process. The designer can use the RPA tool to write software code/script that is associated with each block, that when executed by a computing device, carries out the intended functionality of the block. According to some embodiments, instead of a designer writing the software code/script, the designer can use the RPA tool to import previously written code from another RPA flow chart and either copy or modify the previously written code as necessary for the RPA flow chart being developed. If a block has previously been created by the designer, the designer can simply import the block (and associated code/script) into the current RPA flow chart for reuse. The steps of the RPA flow chart (and their associated code/script) when taken in aggregate can be considered to be an RPA bot that can automatically execute some task that includes multiple steps, such as logging in to a web site, collecting information from a customer, or any other such computer-based process.

Turning now to an overview of the aspects of the invention, one or more embodiments of the invention address the above-described shortcomings of the prior art by providing novel computer-implemented techniques for providing automated RPA design recommendations and/or generation. The novel techniques include utilizing a library of reusable RPA components and providing an automated system for recommending and/or automatically implementing one or more reusable components. According to some embodiments of the invention, the novel techniques can break down an overall desired RPA process as described by a process description document or process specification into a number of micro-robot processes, which can be considered to be sub-processes of the larger RPA process. In other words, the overall desired RPA process can be partitioned into a number of micro-robot processes. The partitioning can be performed on the basis of the type of application (e.g., a word processing application, a spreadsheet application, an internet browser application, etc.) and the type of matter activity (e.g., click, enter text, drag and drop, etc.) associated with each micro-robot as specified by the process description document. These micro-robot processes can be compared against a library of stored micro-robot processes to identify identical or very similar stored micro-robots and any matches can be recommended to a designer or automatically implemented within an RPA design file.

According to some embodiments of the invention, the novel techniques further include performing a gap analysis that can identify that a given micro-robot process being compared to the library of stored micro-robot processes includes one or more steps that the closest matching stored micro-robot is missing. In these cases, the novel techniques nonetheless recommend use of the closest matching stored micro-robot in populating the RPA design file, but can also prompt the design to fill in the gaps by manually entering information for the missing steps. The novel techniques can store the newly completed micro-robot process that includes the newly entered steps (and associated code) in the library for future use. In this way, the development time of new RPA bots can be significantly reduced. A further advantage of the system is that it can be utilized in a variety of platforms.

Turning now to a more detailed description of aspects of the present invention, FIG. 1 depicts a computer-based system 100 configured to execute a novel computer-implemented method for providing automated RPA design recommendations and/or generation in accordance with one or more embodiments of the present invention. The various components, modules, engines, etc. depicted in FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein.

The processing system 100 includes the processing device 102, the memory 104, a process graph generation engine 106, a micro-robot generation engine 108, a micro-robot analysis engine 110 and a robotic process automation (RPA) tool 112. The processing system 100 can be configured to communicate with a user device 120, which may display data to and receive user inputs from a user 121 (e.g., a user input response to accept a recommendation). In some embodiments, user device 120 may be used to transmit data, such as a process description document to the processing system 100. In some embodiments, user device 120 may also be used to interface with an RPA tool of the processing system 100 to allow the user to add, delete, and/or modify aspects of an RPA design file, such as RPA flow chart blocks and/or their associated code/script. According to some embodiments, the processing system 100 may communicate with user device 120 and/or data store 122 via communications network that may be one or more of, or a combination of, public (e.g., Internet), private (e.g., local area network, wide area network, virtual private network), and may include wireless and wireline transmission systems (e.g., satellite, cellular network, terrestrial networks, etc.). In exemplary embodiments, a user device 120 can include, but is not limited to, a desktop computer, a laptop, a tablet, a smartphone, a wearable device such as a smartwatch, an augmented reality headset, a tablet, a smart television, a computer system such as the one shown in FIG. 8, or any other suitable electronic device. The processing system may store and access data via a connected data store 122. According to some embodiments, data store 122 can store a library of micro-robot processes, which may each include one or more steps and associated code/script for executing each step. In some embodiments, the library of micro-robot processes can be stored by processing system 100 or any other connected device(s).

Figure 2:
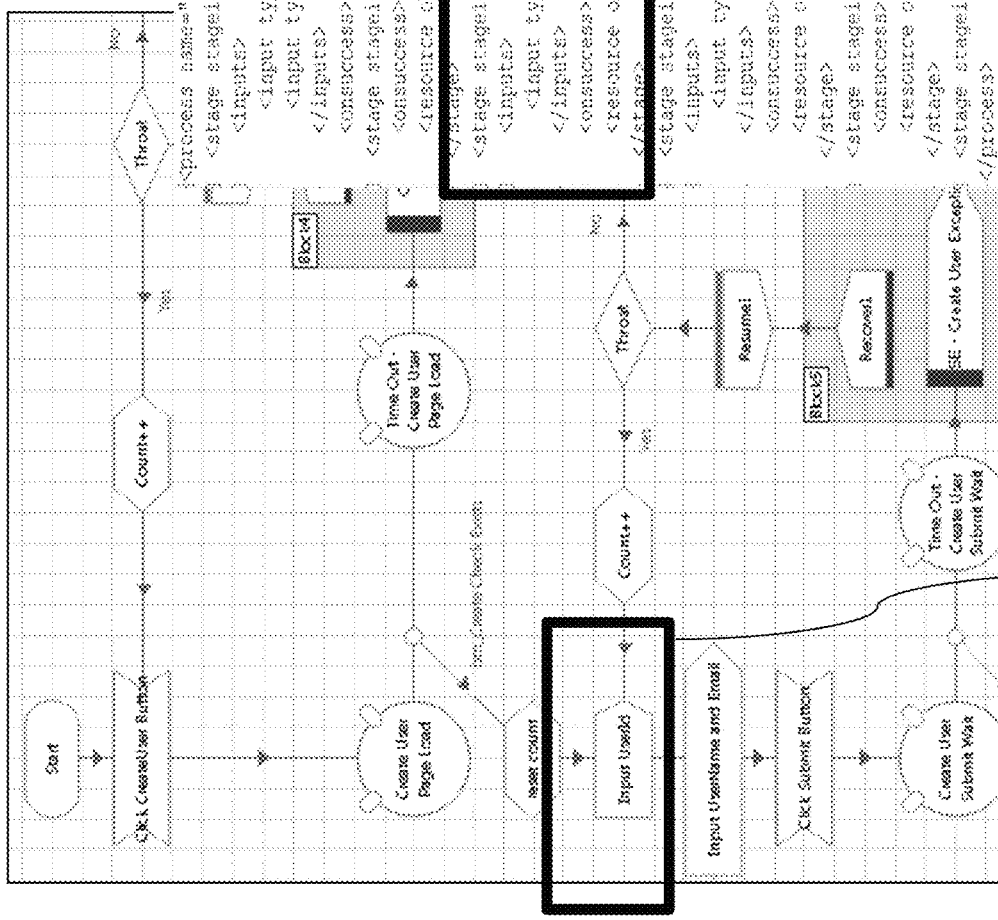
FIG. 2 depicts an example RPA platform development tool according to one or more embodiments of the present invention.

FIG. 2 depicts an example RPA design file 200 having an RPA flow chart 202 made up of various interconnected blocks and a set of associated code/script 204. It will be understood that for the purposes of illustration, only a portion of the RPA flow chart 202 and the set of associated code/script 204 are shown and the set of associated code/script 204 is superimposed over a portion of the RPA flow chart 202 to more easily illustrate the connection between blocks and portions of code/script 204. As will be understood by those of skill in the art, each block of the RPA flow chart 202 can represent a specified functionality that is executed using a portion of the associated set of code/script 204. For example, RPA flow chart block 206 can represent a function of inputting a user ID and code snippet 208 of the set of associated code/script 204 can represent the program code that when executed performs the functionality of RPA flow chart block 206.

While an RPA design file such as the example shown in FIG. 2 is conventionally manually generated by a designer, the processing system 100 of FIG. 1 can generate recommendations and/or automatically generate RPA flow chart blocks and associated code snippets to automatically populate a portion of the RPA design file and significantly reduce the amount of time and effort required to create the RPA design file (i.e., the RPA bot) as described in further detail below with respect to FIG. 3.

Figure 3:
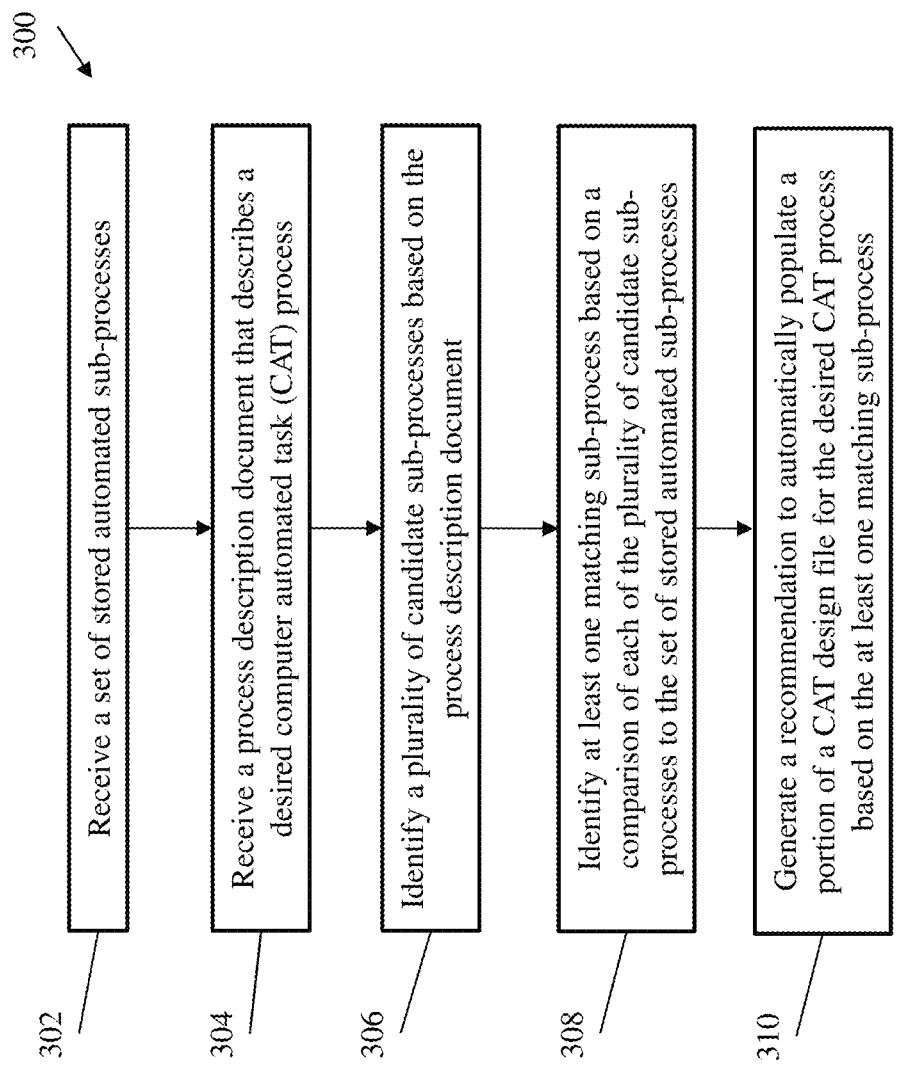
FIG. 3 illustrates a flow diagram of a process for providing automated RPA design generation in accordance with one or more embodiments of the present invention.

FIG. 3 depicts a flow diagram of a method 300 for providing automated robotic process automation (RPA) design generation in accordance with an embodiment is shown. In one or more embodiments of the present invention, the method 300 is computer-implemented and embodied in software that is executed by processing system 100 shown in FIG. 1 and/or computer elements located within a network that may reside in the cloud, such as the cloud computing environment 50 described herein above and illustrated in FIGS. 6 and 7. In other embodiments, the computer elements can reside on a computer system or processing system, such as the processing system 800 described herein above and illustrated in FIG. 8, or in some other type of computing or processing environment.

The method 300 begins at block 302 and includes receiving (e.g., via processing system 100) a set of stored automated sub-processes. In some embodiments, an automated sub-process can be a micro-robot process that is associated with one or more robotic process automation (RPA) blocks (e.g., that can be copied into an RPA flow chart) and associated code/script for executing the functionality of the RPA block. In some embodiments, the set of automated sub-processes can be stored by data store 122 and accessed by processing system 100. In some embodiments, the set of stored automated sub-processes may be stored by processing system 100 (e.g., using memory 104). Each stored automated sub-process may include one or more steps. Each step may represent a specified functionality (e.g., click, drag and drop, enter text, etc.). Each stored automated sub-process may have an associated application with which the sub-process is used. For example, a first stored automated sub-process may be associated with a word processing application (e.g., to automatically open a new document and create a template) and a second stored automated sub-process may be associated with a spreadsheet application (e.g., to automatically collect specified data in a table and perform some predetermined calculations). Further, each stored automated sub-process can be associated with a specified matter activity (e.g., enter username, click, etc.). According to some embodiments, each stored automated sub-process of the set of stored automated sub-processes can be associated with one or more stored RPA blocks and each stored RPA block can be associated with a script that performs an intended function of the RPA block when executed.

As shown at block 304, the method includes receiving (e.g., via processing system 100) a process description document that describes a desired computer automated task (CAT) process, such as for example, a desired RPA process. According to some embodiments, the process description document can be a process specification that includes a list of steps of for a desired RPA process. The process description document may include information associated with each step such as a type of application used to perform the step or a type of matter activity represented by the step. According to some embodiments, the process description document can include a series of documents. For example, the process description document can include one or more of a solution design document (SDD), a process design illustration (PDI), and an object design illustration (ODI). One or more of the documents of the process description document can have a standardized format. In some embodiments, one or more of the documents of the process description document can have a standardized form based on the RPA tool being used (e.g., BluePrism). It will be understood that different RPA tools/programs can have different types or forms of documents that may be part of the process description document.

As shown at block 306, the method includes identifying (e.g., via processing system 100) a plurality of candidate sub-processes based on the process description document. A sub-process can refer to a micro-robot process, which can be a series of sub-steps of a larger overall process that is desired to be automatically executed by an RPA bot. For example, in some embodiments, process graph generation engine 106 can convert the process description document into a process graph that includes a series of desired RPA steps (as described by the process description document) and the micro-robot generation engine 108 can identify the plurality of candidate sub-processes by for example, partitioning the series of steps represented by the process description document based on one or more types of applications (e.g., a word processing application, a spreadsheet application, an internet browser, etc.) and one or more matter activities (e.g., click, drag and drop, enter username, etc.). According to some embodiments, the process graph generation engine 106 can convert the process description document into a process graph in a variety of ways, such as for example, using artificial intelligence to process the process description document using a contextual dictionary as described in, for example, U.S. application Ser. No. 16/246,728 filed Jan. 14, 2019 (titled "Automating a Process Using Robotic Process Automation Code").

Figure 4A:
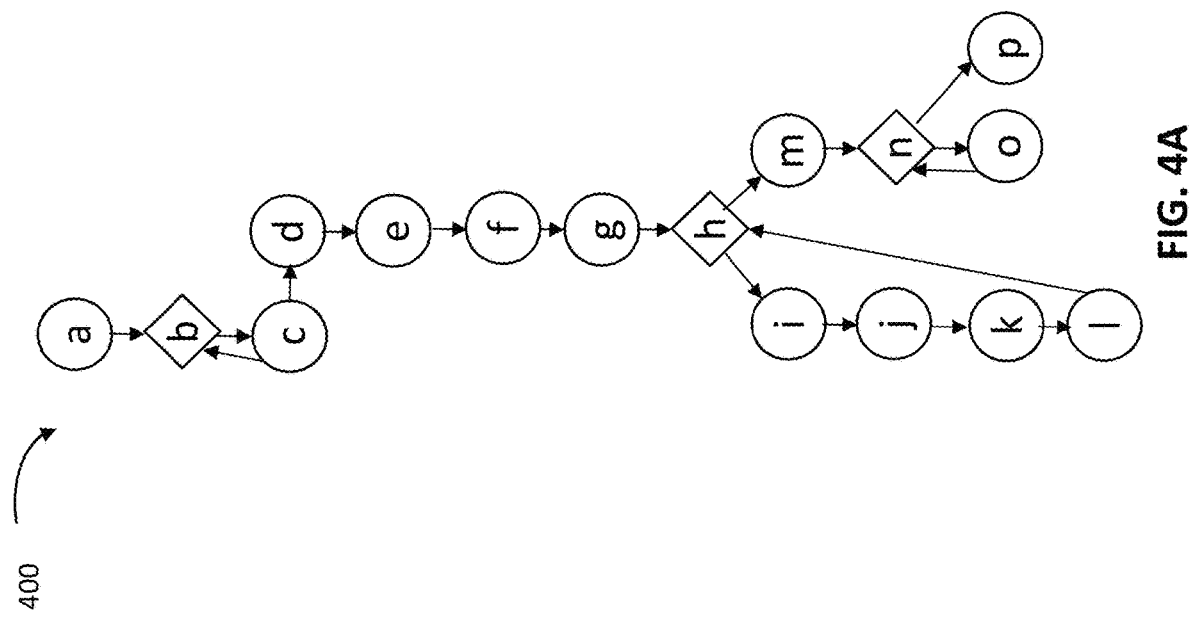
FIG. 4A depicts an example process graph derived from a process description document according to one or more embodiments of the present invention.
Figure 4B:
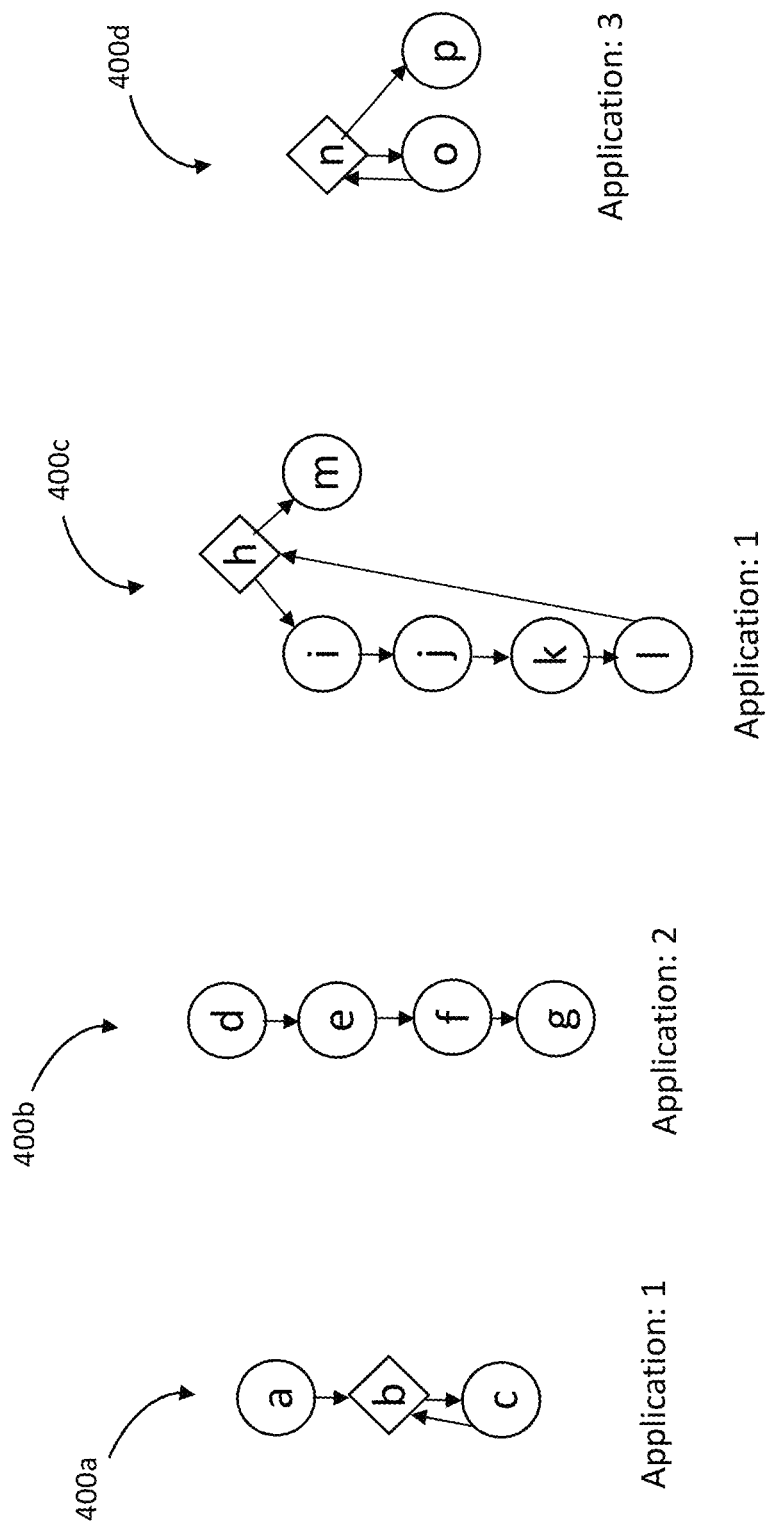
FIG. 4B depicts an example set of candidate micro-robot processes derived from the process graph according to one or more embodiments of the present invention.

For instance, FIG. 4A shows an example process graph 400 that can be generated by process graph generation engine 106 from an example process description document. The example process graph 400 represents the overall desired RPA process described in the process description document. Each step of the process graph is represented by a different block (e.g., blocks "a", "b", "c", etc.) and each block represents a different function to be performed in accordance with the desired RPA process described by the process description document. As will be understood by those of skill in the art, each diamond shaped block (e.g., blocks "b", "h" and "n") of the process graph 400 can represent a decision block, whereas each circular block (e.g., blocks "a", "c", "d", etc.) can represent a function or task to be executed. Each of the blocks can be associated with a type of application and/or a matter activity type (as indicated by the process description document). Generally, one or more successive blocks may have the same application type, but each block may be associated with a different matter activity type. Each matter activity type (and thus each block) can represent multiple steps that are required to perform the associated function/matter activity. According to some embodiments, the micro-robot generation engine 108 can partition the process graph on the basis of the types of applications and/or matter activities associated with the blocks. FIG. 4B shows an example partitioning of the example process graph 400 shown in FIG. 4A into candidate micro-robot processes. In this example, the micro-robot generation engine 108 has partitioned the process graph 400 into four distinct micro-robot processes 400a, 400b, 400c, 400d, where the first micro-robot process 400a is associated with a first application (e.g., a word processing application) and a first activity, the second micro-robot process 400b is associated with a second application (e.g., a spreadsheet application) and a second activity, the third micro-robot process 400c is associated with the first application (e.g., a word processing application) and a third activity, and the fourth micro-robot process 400d is associated with a third application (e.g., an internet browser application) and a fourth activity. In this way, processes that involve different applications can be considered separately from one another, as are different matter activities performed using the same application. This helps avoid problems in which two different applications may have the same or similar steps but are executed using different code because of the nature of the application (e.g., logging into a first software program vs. logging into a different software program). Separating the micro-robot processes based on application type can make the micro-robot codes more reusable for use in other large RPA processes. The sub-processes or micro-robot processes generated by the micro-robot generation engine 108 may be referred to as "candidate sub-processes" or "candidate micro-robot processes" because they are each candidates for comparison against the library of previously stored automated sub-processes and/or micro-robot processes as is explained in more detail below.

As shown at block 308, the method includes identifying (e.g., via processing system 100) at least one matching sub-process based on a comparison of each of the plurality of candidate sub-processes to the set of stored automated sub-processes. For example, micro-robot analysis engine 110 can compare each candidate sub-process to all of the stored automated sub-processes in the library to determine whether there are any matching or similar automated sub-processes that can be copied (at least in part) for the use in an RPA design file for the desired RPA process (i.e., the desired RPA process described by the process description document).

In some embodiments, identifying a matching sub-process can involve determining that each step of a candidate sub-process matches a step of a stored automated sub-process in terms of their associated application and matter activity. However, in some embodiments, even if a stored automated sub-process does not completely match a given candidate sub-process, it may nonetheless be close enough to be substantially useful in reducing the development time of creating a CAT design file (e.g., such as an RPA design file). Thus, according to some embodiments, a matching sub-process can be a stored automated sub-process of the set of stored automated sub-processes that exceeds a threshold level of similarity to a candidate sub-process of the plurality of candidate sub-processes as determined by the micro-robot analysis engine 110.

In some embodiments, each stored automated sub-process includes a plurality of stored steps, each of the candidate sub-processes includes a plurality of candidate steps and the threshold level of similarity can be a minimum percentage of the candidate steps of a candidate sub-process that match stored steps of a stored automated sub-process. For example, if a candidate sub-process has 10 steps and a stored automated sub-process has 8 of the same 10 steps (that are also associated with the same application type), then the stored automated sub-process can be considered to have an 80% level of similarity. In this case, if the threshold level of similarity is 80% or less, then the stored automated sub-process can be considered to "match" the candidate sub-process. As used herein, each candidate step refers to a matter activity or a block of a candidate sub-process or candidate micro-robot process (e.g., block e of micro-robot process 400b shown in FIG. 4B), however it will be understood that each candidate step (i.e., matter activity/block) of a given candidate sub-process can include one or more sub-steps that are followed to perform the function of the candidate step. Thus, in some embodiments, identifying a matching sub-process can include performing a comparison of the sub-steps of a candidate step (i.e., a candidate matter activity or a candidate block) to the sub-steps of a stored step of a stored automated sub-process to determine a degree of similarity between the steps. According to some embodiments, each level of comparison (e.g., candidate steps, candidate sub-steps, etc.) can have its own threshold level of similarity. For example, for a given candidate step to be considered to match a stored step, the stored step must include at least a first threshold number of matching sub-steps to the candidate step, whereas for a given candidate sub-process to be considered to match a stored automated sub-process, the stored automated sub-process must include at least a second threshold number of matching steps to the candidate sub-process. Each such threshold can be user-defined.

As shown at block 310, the method includes generating (e.g., via processing system 100) a recommendation to automatically populate a portion of a CAT design file (such as an RPA design file) for the desired CAT process based on the at least one matching sub-process. According to some embodiments, the CAT design file can include an RPA flow chart of an RPA design tool, such as the RPA flow chart 202 shown in FIG. 2. In some embodiments, the micro-robot analysis engine 110 can generate the recommendation based on the at least one matching sub-process as identified in block 308. For example, if a stored automated sub-process matches 8 out of 10 of the steps of a candidate sub-process, then the micro-robot analysis engine 110 can generate a recommendation to copy the RPA blocks and associated code/script that associated with the matching 8 steps of the stored automated sub-process for use in an RPA design file. The copied RPA blocks can be automatically positioned in locations of an RPA flow chart and connected to other RPA blocks that correspond to their positions and connections in the desired CAT process as described by the process description document. In some embodiments, the copied RPA blocks can be placed in the RPA flow and manually positioned and/or connected by a user. It will be understood that in either case, the associated code/script for executing the functionality of the copied RPA blocks can be automatically copied to the RPA design file such that the designer is not required to write code/script for these RPA blocks.

According to some embodiments, the method 300 can further include automatically populating (e.g., via processing system 100) a portion of the RPA flow chart with one or more stored RPA blocks of at least one matching sub-process. In other words, instead of providing a recommendation for user approval, the RPA engine 112 can simply proceed with automatically generating a portion of the CAT design file in accordance with the recommendation generated by the micro-robot analysis engine 110. In some embodiments, the RPA engine 112 can populate the CAT design file with dummy blocks (i.e., empty blocks having no associated code/script) in any portions corresponding to unmatched steps of the candidate sub-process. A user can use an RPA tool to edit or modify the dummy blocks and/or any of the automatically generated blocks and associated code/script as the user sees fit. In this way, the techniques disclosed herein can allow the user to save a significant amount of development time by reusing RPA blocks/code of previously stored automated sub-processes, while still allowing the user the flexibility to make adjustments and changes to the automatically generated portions of the CAT design file.

In some embodiments, the method 300 can further include transmitting (e.g., via processing system 100) the recommendation to a user device for viewing by a user and automatically populating a portion of the RPA flow chart with one or more stored RPA blocks of at least one matching sub-process in response to receiving a user input indicative of an acceptance of the recommendation. For example, according to some embodiments, the processing system 100 can transmit the recommendation to a user device 120 associated with the user and can receive a communication from the user device 120 indicated an acceptance, rejection or modification of the recommendation. If accepted, the RPA engine 112 can, for example, automatically generate RPA blocks (including the connections between blocks) and associated code/script within a CAT design file that correspond to the matching steps.

In some embodiments, the micro-robot analysis engine 110 can perform a gap analysis in which it determines where there is a "gap" in the steps of a candidate sub-process in which one or more steps of the candidate sub-process is not included in the matching stored automated sub-process. Thus, in some embodiments, the method 300 can further include determining (e.g., via processing system 100) that the at least one matching sub-process has one or more missing steps. According to some embodiments, the micro-robot analysis engine 110 may examine other stored automated sub-processes to try to locate one or more stored steps that match the missing steps (e.g., match the application type and matter activity type) and can use these steps of the other stored automated sub-processes to "fill in the gap." The one or more missing steps includes one or more steps of the candidate sub-process that do not match any stored steps of the at least one matching sub-process. According to some embodiments, the RPA engine 112 can populate the RPA design file with dummy blocks where any unmatched steps (e.g., the unmatched 2 of 10 steps of the previous example) are positioned within the process flow of the candidate RPA process, and the user can utilize an RPA tool to manually fill in these blocks and their associated code/script. Further, in some embodiments, the recommendation can include an indication of the one or more missing steps and the method 300 can further include: automatically populating a portion of the RPA flow chart with one or more stored RPA blocks of at least one matching sub-process, transmitting the recommendation to a user device for viewing by a user and populating another portion of the RPA flow chart with the one or more user-generated RPA blocks in response to receiving one or more user-generated RPA blocks associated with the missing steps. In other words, in response to receiving a recommendation that includes both matching steps that can be auto-generated and missing steps, the user can accept the recommendation and input information sufficient to build RPA blocks and associated code/script to "fill in" the missing blocks and generate the new micro-robot process within the RPA design file. In response to "filling in" missing RPA blocks/code in this manner, in some embodiments, the method can further include updating (e.g., via processing system 100) the set of stored automated sub-processes or micro-robot processes to include the one or more user-generate RPA blocks. Thus, the micro-robot process library can continue to grow over time and the next time a desired RPA process includes a micro-robot process that is similar to the newly created one, it will take significantly less time to develop as the newly created RPA micro-robot process can be reused. In this way, as more and more micro-robot processes (i.e., automated sub-processes) are stored in the library, the average RPA bot development time will tend to decrease as more and more previous examples are available to be reused.

Figure 5:
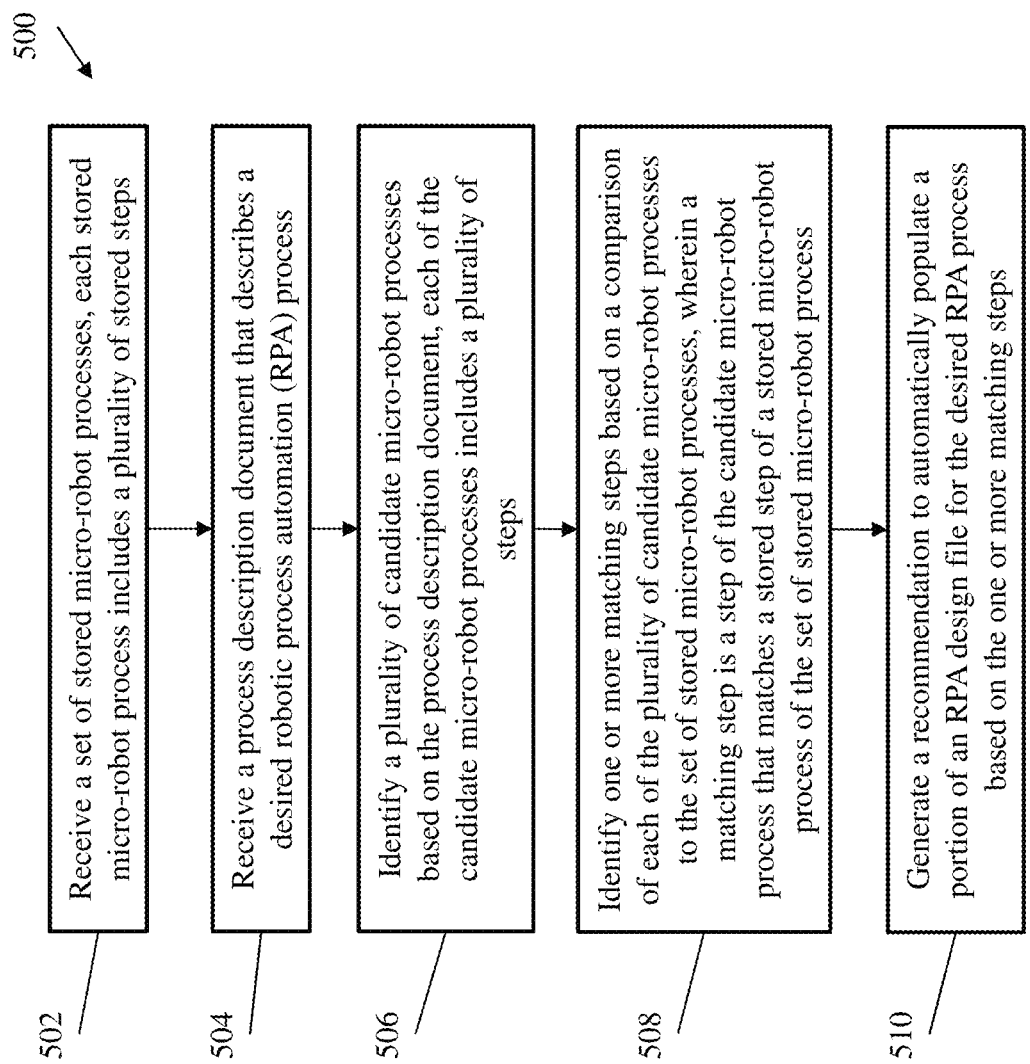
FIG. 5 illustrates a flow diagram of another process for providing automated RPA design generation in accordance with one or more embodiments of the present invention.

Turning now to FIG. 5, a flow diagram of another method 500 for providing automated RPA design generation in accordance with an embodiment is shown. In one or more embodiments of the present invention, the method 500 is embodied in software that is executed by processing system 100 shown in FIG. 1 and/or computer elements located within a network that may reside in the cloud, such as the cloud computing environment 50 described herein above and illustrated in FIGS. 6 and 7. In other embodiments, the computer elements may reside on a computer system or processing system, such as the processing system 800 described herein above and illustrated in FIG. 8, or in some other type of computing or processing environment.

The method 500 begins at block 502 and includes receiving (e.g., via processing system 100) a set of stored micro-robot processes in a manner similar to that described above with respect to block 302. Each stored micro-robot process includes a plurality of stored steps. For example, each step of a stored micro-robot process can correspond to an RPA block and associated code/script as shown in FIG. 2.

As shown at block 504, the method includes receiving (e.g., via processing system 100) a process description document that describes a desired robotic process automation (RPA) process in a manner similar to that described above with respect to block 304.

As shown at block 506, the method includes identifying (e.g., via processing system 100) a plurality of candidate micro-robot processes based on the process description document in a manner similar to that described above with respect to block 36. Each of the candidate micro-robot processes includes a plurality of steps.

As shown at block 508, the method includes identifying (e.g., via processing system 100) one or more matching steps based on a comparison of each of the plurality of candidate micro-robot processes to the set of stored micro-robot processes. According to some embodiments, a matching step is a step of a candidate micro-robot process that matches a stored step of a stored micro-robot process of the set of stored micro-robot processes. According to some embodiments, a step can match if it has the same application type and matter activity type as the other step. In some embodiments, a candidate step of a candidate micro-robot process can be considered to match a step of a stored micro-robot process if the candidate step has the same application type and matter activity type as the stored step of the stored micro-robot process and additionally, as previously described above, if the sub-steps of the candidate step and the stored step exceed a predetermined threshold level of similarity when compared to one another.

As shown at block 510, the method includes generating (e.g., via processing system 100) a recommendation to automatically populate a portion of an RPA design file for the desired RPA process based on the one or more matching steps in a manner similar to that described above with respect to block 310.

Additional processes may also be included. It should be understood that the processes depicted in FIGS. 3 and 5 represent illustrations, and that other processes may be added or existing processes may be removed, modified, or rearranged without departing from the scope and spirit of the present disclosure.

Figure 6:
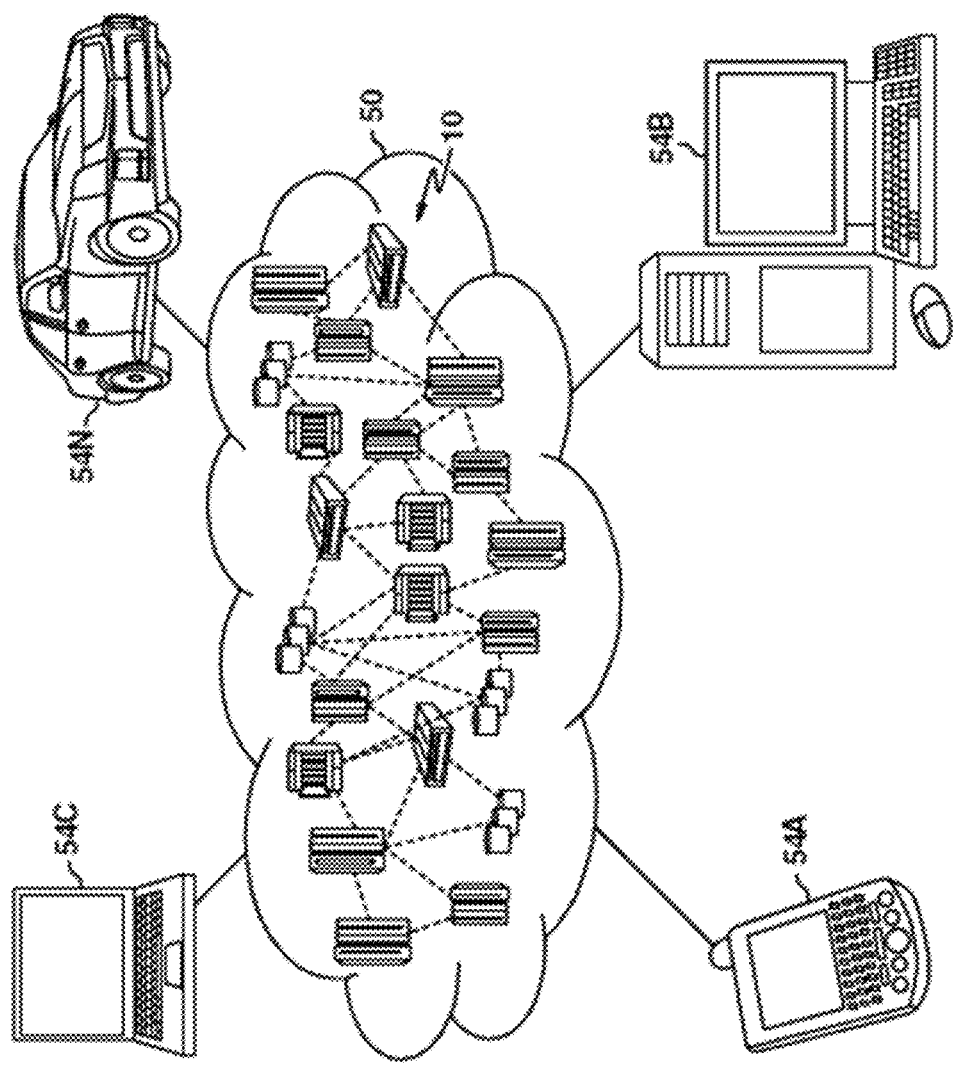
FIG. 6 illustrates a cloud computing environment according to one or more embodiments of the present invention.
Figure 7:
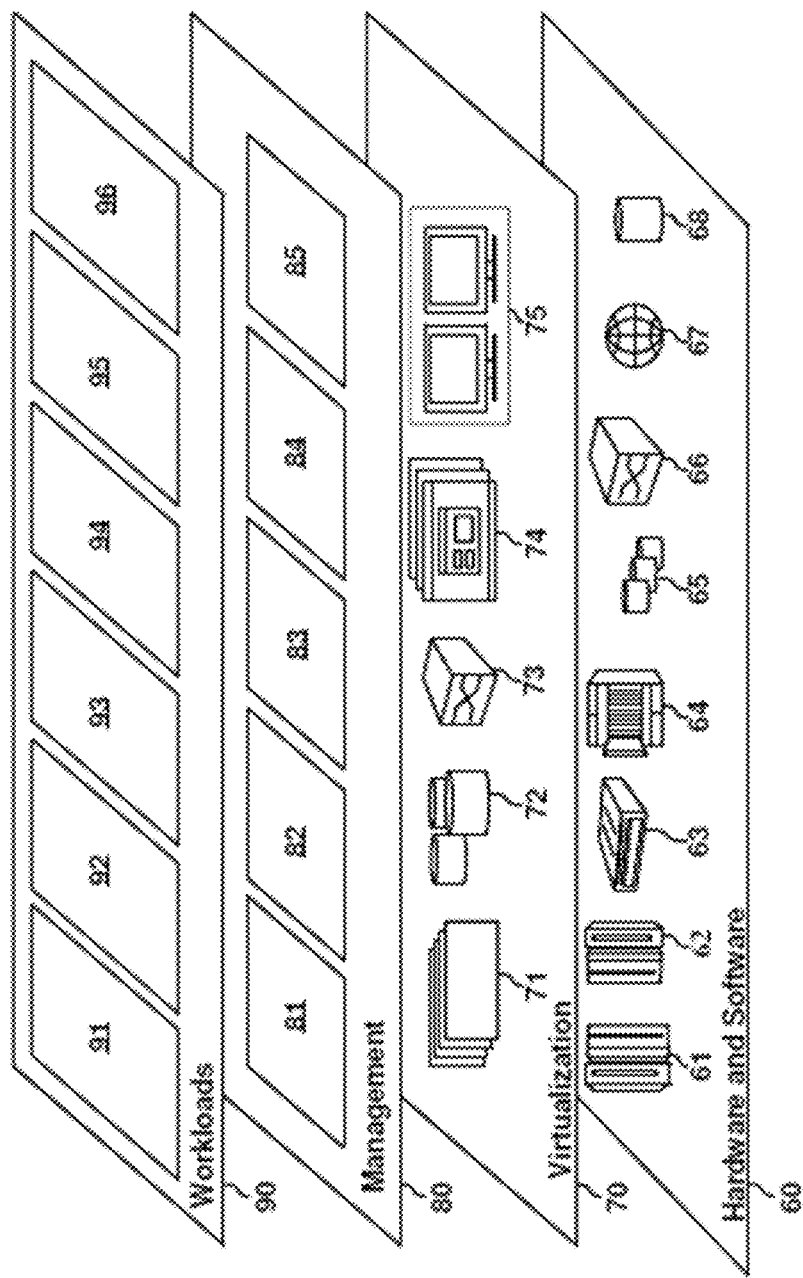
FIG. 7 illustrates abstraction model layers according to one or more embodiments of the present invention.

FIG. 6 depicts a cloud computing environment according to one or more embodiments of the present invention. FIG. 7 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing automated RPA design generation 96.

Figure 8:
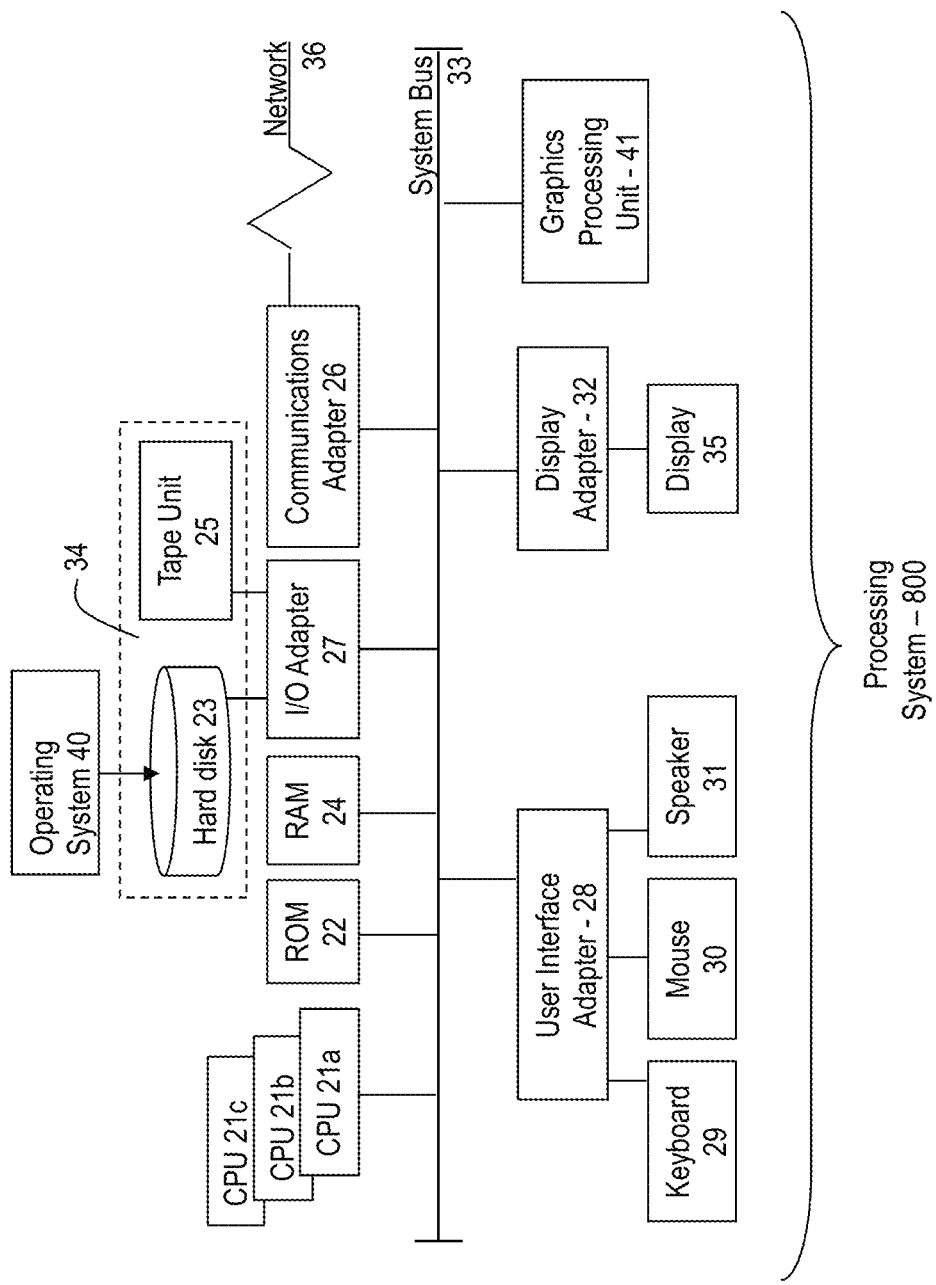
FIG. 8 illustrates a block diagram of a computer system for use in implementing one or more embodiments of the present invention.

FIG. 8 depicts a processing system for implementing one or more embodiments of the present invention. It is understood that one or more embodiments of the present invention are capable of being implemented in conjunction with any other type of computing environment now known or later developed. For example, FIG. 8 depicts a block diagram of a processing system 800 for implementing the techniques described herein. In accordance with one or more embodiments of the present invention, processing system 100 and/or system 800 can be an example of a cloud computing node 10 of FIG. 6. In the embodiment shown in FIG. 8, processing system 800 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 800.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 800 can be stored in mass storage 34. The RAM 24, ROM 22, and mass storage 34 are examples of memory 19 of the processing system 800. A network adapter 26 interconnects system bus 33 with an outside network 36 enabling the processing system 800 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 800 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 800 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 800.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A non-transitory computer-implemented method comprising:
    receiving, by a processor, a set of stored automated sub-processes, a first stored automated sub-process comprising computer executable instructions that cause a one or more software applications to perform a first set of steps;
    receiving, by the processor, a process description document that describes a desired computer automated task (CAT) process, the CAT process comprising a plurality of steps to be performed by the one or more software applications;
    generating, by the processor, based on the process description document, a process graph comprising a plurality of blocks, each block representing a function to be performed by a software application as part of the CAT process;
    determining, by the processor, a plurality of candidate sub-processes of the CAT process by partitioning the blocks from the process graph based on a combination of a software application and a function associated with a block, wherein a partition comprises one or more blocks that are associated with a particular combination of the function and a software application, each partition represents a candidate sub-process that comprises a second set of steps to be performed by the one or more software applications;
    comparing, by the processor, each candidate sub-process with the set of stored automated sub-processes;

identifying, by the processor, based on the comparison a first candidate sub-processes from the CAT process to be matching with the first automated sub-process from the set of stored automated sub-processes, wherein the first candidate sub-process is determined to match the first stored automated sub-process in response to at least a threshold number of steps from the first set of steps matching the second set of steps; and generating, by the processor, a CAT design file for the desired CAT process by copying the matching first stored automated sub-process into the CAT design file, and marking one or more steps from the first set of steps of the first stored automated sub-process to be completed the one or more steps being those that do not match with the second set of steps.

2. The non-transitory computer-implemented method of claim 1, wherein the CAT design file comprises a robotic process automation (RPA) flow chart.

3. The non-transitory computer-implemented method of claim 2, wherein each stored automated sub-process of the set of stored automated sub-processes is associated with one or more stored RPA blocks and each stored RPA block comprises a script that performs an intended function of the RPA block when executed.

4. The non-transitory computer-implemented method of claim 1 further comprising:
transmitting the CAT design file to a user device for viewing by a user; and
responsive to receiving a user input indicative of completion of the marked one or more steps, automatically populating a portion of the RPA flow chart with one or more stored RPA blocks of the matching first stored automated sub-process.

5. The non-transitory computer-implemented method of claim 1, the method further comprising:
responsive to receiving one or more user-generated RPA blocks associated with the one or more marked steps, populating another portion of the RPA flow chart with the one or more user-generated RPA blocks.

6. The non-transitory computer-implemented method of claim 5 further comprising updating the set of stored automated sub-processes to include the one or more user-generated RPA blocks.

7. A system comprising:
a memory having computer readable instructions; and
one or more processors for executing the computer readable instructions, the computer readable instructions controlling the one or more processors to perform operations comprising:
receiving a set of stored automated sub-processes, a first stored automated sub-process comprising computer executable instructions that cause a one or more software applications to perform a first set of steps;
receiving a process description document that describes a desired computer automated task (CAT) process, the CAT process comprising a plurality of steps to be performed by the one or more software applications;
generating based on the process description document, a process graph comprising a plurality of blocks, each block representing a function to be performed by a software application as part of the CAT process;
determining a plurality of candidate sub-processes of the CAT process by partitioning the blocks from the process graph based on a combination of a software application and a function associated with a block, wherein a partition comprises one or more blocks that are associated with a particular combination of the function and a software application, each partition represents a candidate sub-process that comprises a second set of steps to be performed by the one or more software applications;
comparing each candidate sub-process with the set of stored automated sub-processes;
identifying based on the comparison a first candidate sub-processes from the CAT process to be matching with the first automated sub-process from the set of stored automated sub-processes, wherein the first candidate sub-process is determined to match the first stored automated sub-process in response to at least a threshold number of steps from the first set of steps matching the second set of steps; and
generating a CAT design file for the desired CAT process by copying the matching first stored automated sub-process into the CAT design file, and marking one or more steps from the first set of steps of the first stored automated sub-process to be completed the one or more steps being those that do not match with the second set of steps.

8. The system of claim 7, wherein the CAT design file comprises a robotic process automation (RPA) flow chart.

9. The system of claim 8, wherein each stored automated sub-process of the set of stored automated sub-processes is associated with one or more stored RPA blocks and each stored RPA block comprises a script that performs an intended function of the RPA block when executed.

10. The system of claim 9, further comprising:
transmitting the CAT design file to a user device for viewing by a user; and
responsive to receiving a user input indicative of completion of the marked one or more steps, automatically populating a portion of the RPA flow chart with one or more stored RPA blocks of the matching first stored automated sub-process.

11. A non-transitory computer program product for providing automated robotic process automation design generation, the computer program product comprising a computer readable storage medium having program instructions embodied therewith, the program instructions executable by a computer processor to cause the computer processor to perform a method comprising:
receiving a set of stored automated sub-processes, a first stored automated sub-process comprising computer executable instructions that cause a one or more software applications to perform a first set of steps;
receiving a process description document that describes a desired computer automated task (CAT) process, the CAT process comprising a plurality of steps to be performed by the one or more software applications;
generating based on the process description document, a process graph comprising a plurality of blocks, each block representing a function to be performed by a software application as part of the CAT process;
determining a plurality of candidate sub-processes of the CAT process by partitioning the blocks from the process graph based on a combination of a software application and a function associated with a block, wherein a partition comprises one or more blocks that are associated with a particular combination of the function and a software application, each partition represents a candidate sub-process that comprises a second set of steps to be performed by the one or more software applications;

comparing each candidate sub-process with the set of stored automated sub-processes;

identifying based on the comparison a first candidate sub-processes from the CAT process to be matching with the first automated sub-process from the set of stored automated sub-processes, wherein the first candidate sub-process is determined to match the first stored automated sub-process in response to at least a threshold number of steps from the first set of steps matching the second set of steps; and generating CAT design file for the desired CAT process by copying the matching first stored automated sub-process into the CAT design file, and marking one or more steps from the first set of steps of the first stored automated sub-process to be completed the one or more steps being those that do not match with the second set of steps.

12. The non-transitory computer program product of claim 11, wherein the CAT design file comprises a robotic process automation (RPA) flow chart.

13. The non-transitory computer program product of claim 12, wherein each stored automated sub-process of the set of stored automated sub-processes is associated with one or more stored RPA blocks and each stored RPA block comprises a script that performs an intended function of the RPA block when executed.

* * * * *